United States Patent [19]
Horie et al.

[11] Patent Number: 5,558,060
[45] Date of Patent: Sep. 24, 1996

[54] INTERNAL COMBUSTION ENGINE

[75] Inventors: Kaoru Horie; Hitoshi Takahashi; Atsushi Umemoto, all of Saitama, Japan

[73] Assignee: Honda Giken Kogyo Kabushiki Kaisha, Tokyo, Japan

[21] Appl. No.: 314,429

[22] Filed: Sep. 28, 1994

[30] Foreign Application Priority Data

Sep. 28, 1993 [JP] Japan .................................. 5-241723

[51] Int. Cl.$^6$ .................................................. F02B 31/00
[52] U.S. Cl. ...................................... 123/308; 123/90.16
[58] Field of Search .................................. 123/308, 432, 123/90.16, 90.15

[56] References Cited

U.S. PATENT DOCUMENTS

| | | | |
|---|---|---|---|
| 4,667,636 | 5/1987 | Oishi et al. | 123/308 |
| 4,759,321 | 7/1988 | Matsumoto et al. | 123/90.15 |
| 5,119,784 | 6/1992 | Hashimoto et al. | 123/432 |
| 5,172,674 | 12/1992 | Horie et al. | 123/571 |
| 5,209,201 | 5/1993 | Horie et al. | 123/90.16 |
| 5,347,962 | 9/1994 | Nakamura et al. | 123/90.16 |

FOREIGN PATENT DOCUMENTS

| | | |
|---|---|---|
| 470869 | 2/1992 | European Pat. Off. . |
| 607992 | 1/1994 | European Pat. Off. . |
| 3515044 | 4/1985 | Germany . |
| 4103918 | 2/1991 | Germany . |
| 2257204 | 1/1993 | United Kingdom . |

OTHER PUBLICATIONS

Search Report Transmittal.

*Primary Examiner*—Erick R. Solis
*Attorney, Agent, or Firm*—Lyon & Lyon

[57] ABSTRACT

An internal combustion engine includes a valve operating device operatively connected to a pair of intake valves and capable of opening and closing one of the intake valves in accordance with the operating condition of the engine and opening and closing the other intake valve in a small lift amount, thereby producing a deflection of the intake air drawn into the combustion chamber, and a fuel injection valve for injecting a fuel toward the pair of intake valve bores that are independently opened and closed by the intake valves, respectively. The timing of the opening and closing of the intake valve that is opened and closed only in the small lift amount is set at a time point such that the lift amount is maximized in the first half of the intake stroke of the piston. This promotes the atomization of the fuel which is being drawn in with the intake air by the opening of the intake valve opened and closed in the small lift amount, and to enhance the combustibility in the combustion chamber.

13 Claims, 8 Drawing Sheets

Crank angle

INTERNAL COMBUSTION ENGINE

BACKGROUND OF THE INVENTION

1. Field of the Invention

The present invention relates to an internal combustion engine having a valve operating device operatively connected to a pair of intake valves and capable of opening and closing one of the intake valves in accordance with an operating condition of the engine while only opening and closing the other intake valve in a small lift amount, thereby producing a deflection of the intake air drawn into the combustion chamber, and a fuel injection valve for injecting the fuel toward intake valve bores independently opened and closed by the intake valves.

2. Description of the Prior Art

Such internal combustion engines have been already known, for example, from Japanese Patent Application Laid-open No. 94407/92.

In the above prior art internal combustion engine, the timing of opening and closing of the intake valve opened and closed in the small lift amount is set in a second half of an intake stroke, thereby eliminating an adverse influence on the production of a swirl due to the opening of the other intake valve. However, it has been ascertained by an experiment by the present inventors that the flow speed of the intake air drawn into the combustion chamber at the time of the opening of the intake valve is higher in a first half of the intake stroke and lower in the second half. For atomizing the fuel when the intake valves are opened in a small lift amount, it is disadvantageous that the opening and closing timing is set in the second half of the intake stroke, as in the above-described prior art.

SUMMARY OF THE INVENTION

Accordingly, it is an object of the present invention to provide an internal combustion engine, wherein the atomization of the fuel being drawn at the time of opening of the intake valve that is opened and closed only in the small lift amount is promoted to enhance the combustibility in the combustion chamber.

To achieve the above object, according to claim 1 of the present invention, there is provided an internal combustion engine comprising: a valve operating device operatively connected to a pair of intake valves and capable of opening and closing one of the intake valves in accordance with an operating condition of the engine while only opening and closing the other intake valve in a small lift amount, thereby producing a deflection of the intake air drawn into the combustion chamber; and a fuel injection valve for injecting the fuel toward intake valve bores independently opened and closed by the intake valves, respectively; wherein the timing of the opening and closing of the intake valve which is opened and closed only in the small lift amount is set at a time point such that the lift amount is maximized in the first half of the intake stroke.

It is another object of the present invention to provide a stability of control of the air-fuel ratio and increase the power output from the engine by supplying a sufficient amount of a fuel toward the intake valve bores, when both the intake valves are opened and closed.

It is a further object of the present invention to further promote the atomization of the fuel to further enhance the combustibility.

It is a yet further object of the present invention to reliably introduce the fuel by opening the intake valve in a small lift amount to contribute to a stability of control of the air-fuel ratio by the fact that the injection of the fuel has been completed when the intake valve is opened in the small lift amount.

The above and other objects, features and advantages of the invention will become apparent from the following description of a preferred embodiment taken in conjunction with the accompanying drawings.

DESCRIPTION OF THE PREFERRED EMBODIMENT

The present invention will now be described by way of a preferred embodiment in connection with the accompanying drawings.

Figure 1:
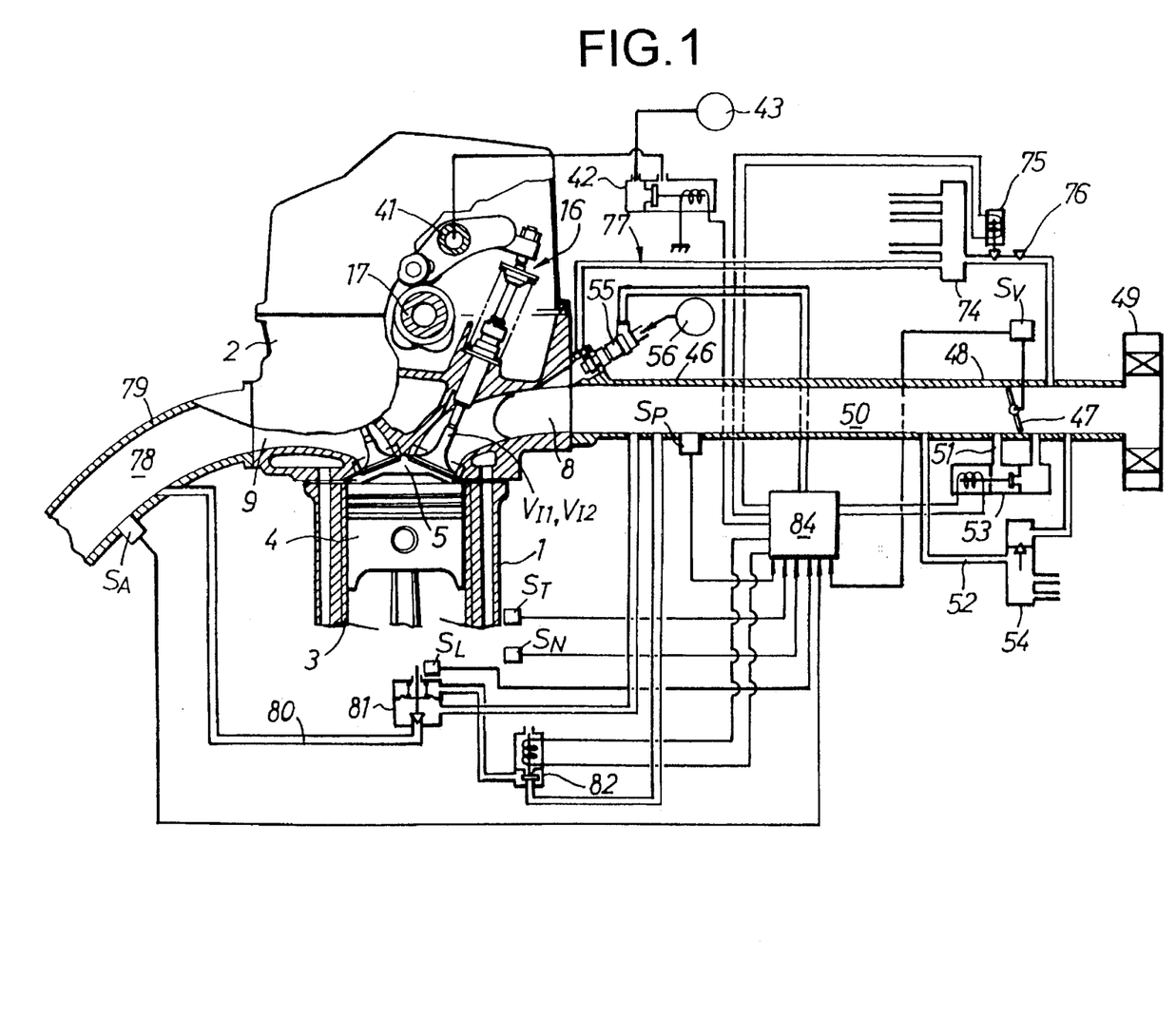
FIG. 1 is diagrammatic illustration of the relevant portions of an internal combustion engine for describing the present invention.
Figure 2:
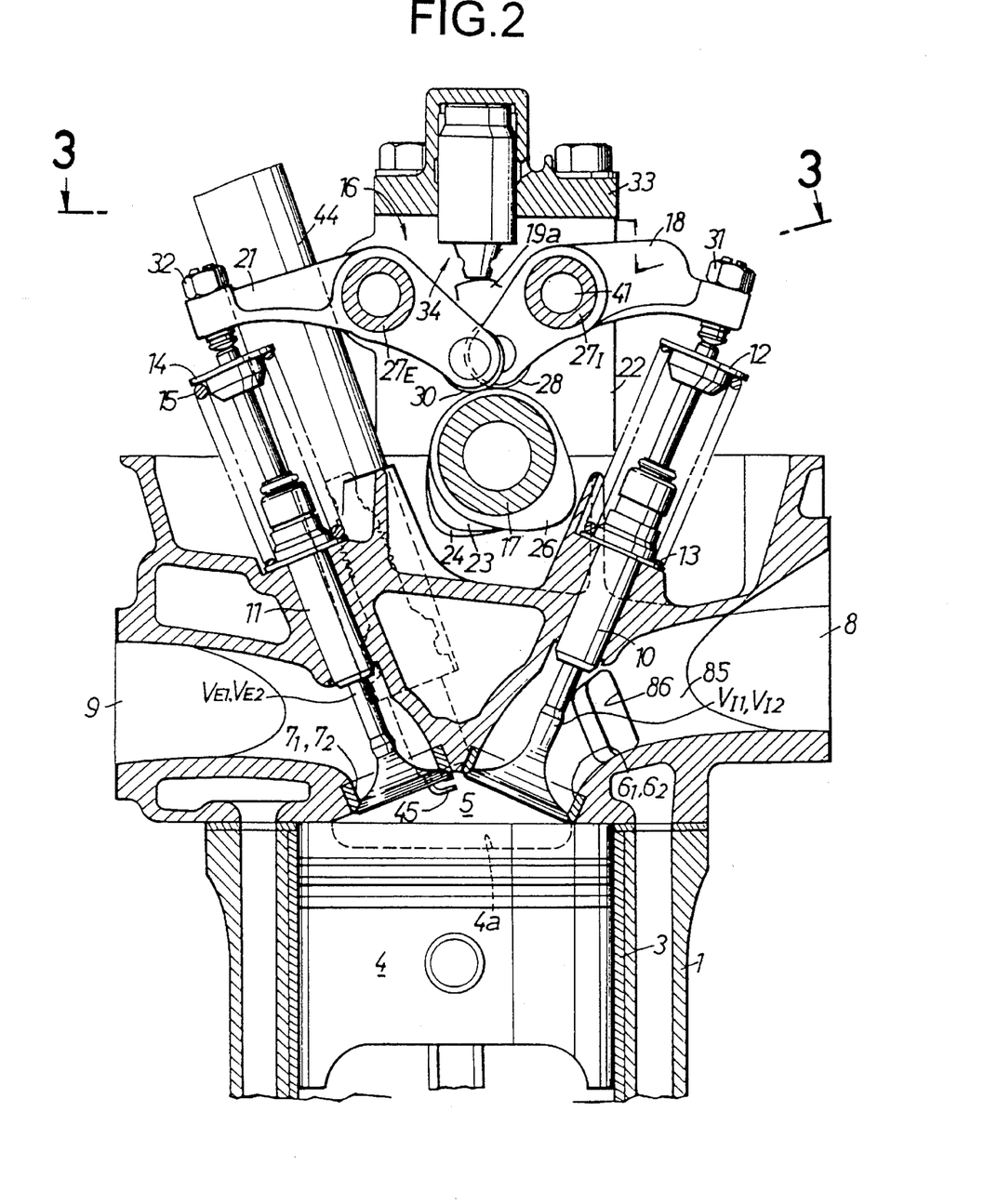
FIG. 2 is an enlarged vertical sectional view of a valve operating device of the engine, taken along a line 2—2 in FIG. 3.

Referring first to FIGS. 1 and 2, the essential portions of an engine body in an single overhead cam (SOHC) type multi-cylinder internal combustion engine are a cylinder head 2 coupled to an upper surface of a cylinder block 1 and a piston 4 slidably received in each of a plurality of cylinders 3 provided in the cylinder block 1. The piston 4 has recess 4a in its upper surface. A combustion chamber 5 is defined between the upper surface of each of the pistons 4 and the cylinder head 2.

A pair of intake valve bores $6_1$ and $6_2$ and a pair of exhaust valve bores $7_1$ and $7_2$ are provided in the cylinder head 2 that open into a ceiling surface of the combustion chamber 5. The intake valve bores $6_1$ and $6_2$ communicate with a single intake port 8 that opens into one side of the cylinder head 2, while the exhaust valve bores $7_1$ and $7_2$ communicate with a single exhaust port 9 that opens into the other side of the cylinder head 2. A pair of intake valves $V_{I1}$ and $V_{I2}$ capable of independently opening and closing the intake valve bores $6_1$ and $6_2$, respectively are slidably fitted in a pair of guide sleeves 10 disposed in the cylinder head 2. A retainer 12 is fixed to an upper end of each of the intake valves $V_{I1}$ and $V_{I2}$ which projects from the guide sleeve 10. A coiled valve spring 13 is interposed between each of the retainers 12 and the cylinder head 2 to surround a corresponding one of the intake valves $V_{I1}$ and $V_{I2}$, so that each of the intake valves $V_{I1}$ and $V_{I2}$ is biased upwardly, i.e., in a closing direction by the corresponding valve spring 13. Further, a pair of exhaust valves $V_{E1}$ and $V_{E2}$ capable of independently opening and closing the exhaust valve bores $7_1$ and $7_2$, respectively, are slidably fitted in a pair of guide sleeves 11 disposed in the cylinder head 2. A retainer 14 is fixed to an upper end of each of the exhaust valves $V_{E1}$ and $V_{E2}$ which projects from the guide sleeve 11. A coiled valve spring 15 is interposed between each of the retainers 14 and the cylinder head 2 to surround a corresponding one of the exhaust valves $V_{E1}$ and $V_{E2}$, so that each of the exhaust valves $V_{E1}$ and $V_{E2}$ is biased upwardly, i.e., in a closing direction by the corresponding valve spring 15.

A valve operating device 16 is provided in the cylinder head 2 for operating the intake valves $V_{I1}$ and $V_{I2}$ and the exhaust valves $V_{E1}$ and $V_{E2}$. The valve operating device 16 includes a single cam shaft 17 operatively connected at a reduction ratio of ½ to a crankshaft which is not shown, first, second and third intake-side rocker arms 18, 19 and 20 for converting the rotating motion of the cam shaft 17 into opening and closing motions of the intake valves $V_{I1}$ and $V_{I2}$, and a pair of exhaust-side rocker arms 21, 21 for converting the rotating motion of the cam shaft 17 into opening and closing motions of the exhaust valves $V_{E1}$ and $V_{E2}$.

The cam shaft 17 is rotatably carried by the cylinder head 2 and holders 22 coupled onto the cylinder head 2 on opposite sides of the cylinder 3 along an axis parallel to the axis of the crankshaft, and has a horizontal axis perpendicular to the axis of the cylinder 3.

The cam shaft 17 is integrally provided with a first intake-side opening and closing cam 23 having a shape corresponding to a low-speed operation of the engine, a second intake-side opening and closing cam 24 disposed adjacent one side of the first intake-side opening and closing cam 23 and having a shape corresponding to a high-speed operation of the engine, and a slight-operating cam 25 disposed adjacent one side of the second intake-side opening and closing cam 24. The camshaft 17 is also integrally provided with exhaust-side opening and closing cams 26, 26 disposed on opposite sides of the first intake-side opening and closing cam 23 and the slight-operating cam 25.

Figure 3:
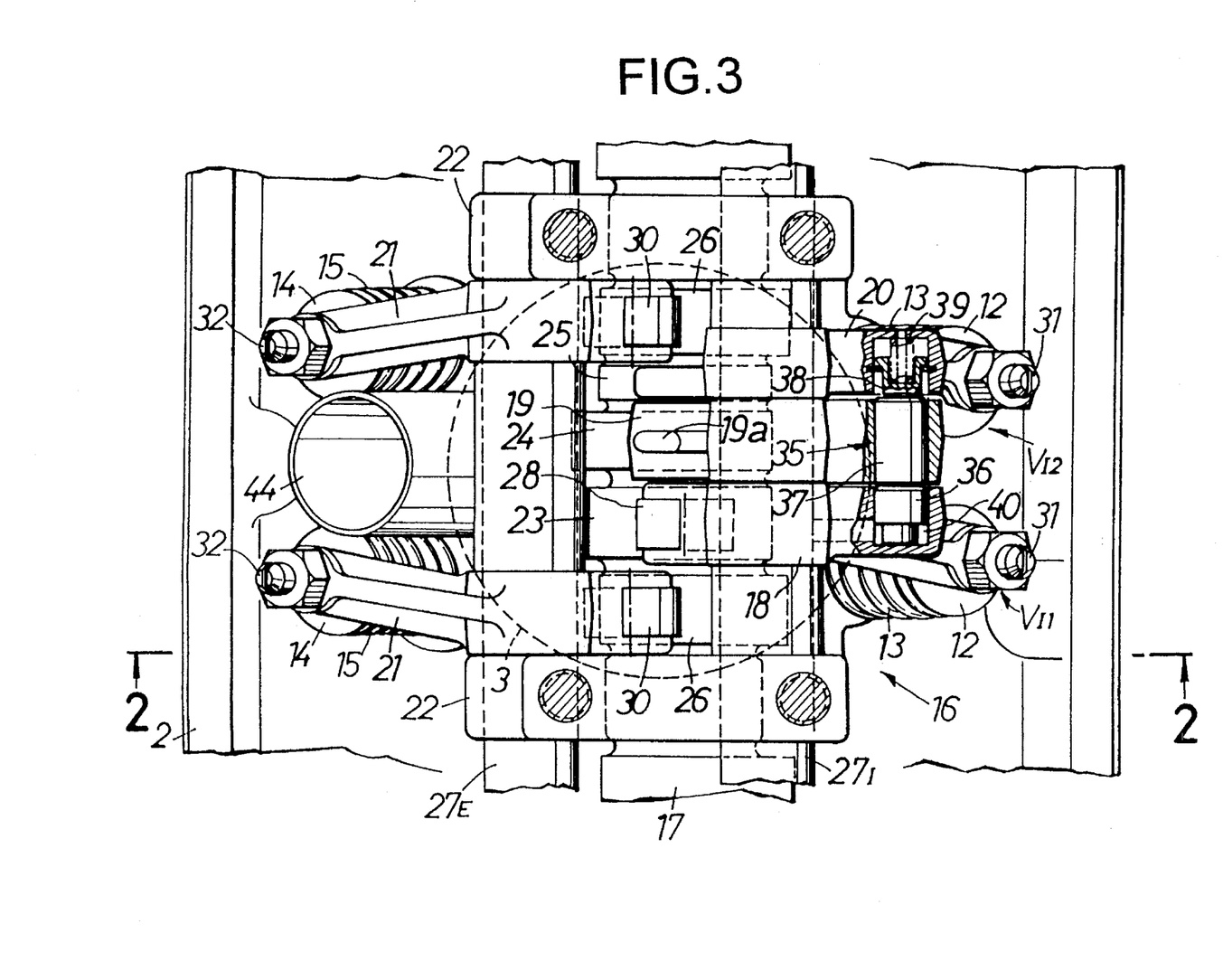
FIG. 3 is a sectional plan view taken along a line 3—3 in FIG. 2.

The first intake-side rocker arm 18 is operatively connected to one of the intake valves $V_{I1}$, and the third intake-side rocker arm 20 is operatively connected to the other intake valve $V_{I2}$. The second intake-side rocker arm 19 is disposed between the first and third intake-side rocker arms 18 and 20 and is capable of being free to pivot with respect to the intake valves $V_{I1}$ and $V_{I2}$. The intake-side rocker arms 18, 19 and 20 are swingably carried on an intake-side rocker shaft $27_I$. The exhaust-side rocker arms 21, 21 are independently operatively connected to the exhaust valves $V_{E1}$ and $V_{E2}$ and are swingably carried on an exhaust-side rocker shaft $27_E$.

A roller 28 is rotably mounted by a pin (not shown or numbered) or the like on one end of the first intake-side rocker arm 18 to be in rolling contact with the first intake-side opening and closing cam 23. One end of each of the second and third intake-side rocker arms 19 and 20 are in sliding contact with the second intake-side opening and closing cam 24 and the slight-operating cam 25, respectively. Rollers 30, 30 are rotatably mounted by pins (not shown or numbered) or the like at one end of each of the exhaust-side rocker arms 21, 21 to be in rolling contact with the exhaust-side opening and closing cams 26, 26, respectively.

Tappet screws 31, 31 are threadedly fitted into the other ends of the first and third intake-side rocker arms 18 and 20 for advancing and retracting adjustment movements to abut against upper ends of the intake valves $V_{I1}$ and $V_{I2}$, so that the intake valves $V_{I1}$ and $V_{I2}$ are opened and closed in response to the swinging movements of the first and third intake-side rocker arms 18 and 20, respectively. Tappet screws 32, 32 are threadedly fitted into the other ends of the exhaust-side rocker arms 21, 21 for advancing and retracting adjustment movements to abut against upper ends of the exhaust valves $V_{E1}$ and $V_{E2}$, so that the exhaust valves $V_{E1}$ and $V_{E2}$ are opened and closed in response to the swinging movements of the exhaust-side rocker arms 21, 21, respectively.

A support plate 33 is fixedly mounted on upper surfaces of the holders 22 and extends above the cylinder 3. A lost motion mechanism 34 is disposed in the support plate 33 for resiliently biasing the second intake-side rocker arm 19 in a direction to maintain it in sliding contact with the second intake-side opening and closing cam 24 on the cam shaft 17. A projection 19a is provided on the second intake-side rocker arm 19 for sliding contact with the lost motion mechanism 34.

A valve operating-characteristic varying means 35 is provided in the first, second and third intake-side rocker arms 18, 19 and 20. The valve operating-characteristic varying means 35 includes a connecting piston 36 capable of interconnecting the first intake-side rocker arm 18 and the second intake-side rocker arm 19, a connecting pin 37 capable of interconnecting the second intake-side rocker arm 19 and the third intake-side rocker arm 20, a limiting member 38 for limiting the movements of the connecting piston 36 and the connecting pin 37, and a return spring 39 for biasing the connecting piston 36, the connecting pin 37 and the limiting member 38 toward their disconnecting positions.

The connecting piston 36 is slidably fitted into the first intake-side rocker arm 18 for movement in an axial direction parallel to the intake-side rocker shaft $27_I$. A hydraulic pressure chamber 40 is defined between one end of the connecting piston 36 and the first intake-side rocker arm 18 and is connected to an oil passage 41 in the intake-side rocker shaft $27_I$. The oil passage 41 is connected to a hydraulic pressure source 43 through a connection switching solenoid valve 42, as shown in FIG. 1.

The connecting pin 37 with one end abutting against the other end of the connecting piston 36 is slidably fitted into the second intake-side rocker arm 19 for sliding movement in an axial direction parallel to the intake-side rocker shaft $27_I$. Further, the bottomed cylindrical limiting member 38 abutting against the other end of the connecting pin 37 is slidably fitted into the third intake-side rocker arm 20 for sliding movement in an axial direction parallel to the intake-side rocker shaft $27_I$. The return spring 39 is mounted under compression between the limiting member 38 and the third intake-side rocker arm 20.

In such valve operating-characteristic varying means 35, when the hydraulic pressure in the hydraulic pressure chamber 40 is released in a low-speed rotational range of the engine, the mutually abutting faces of the connecting piston 36 and the connecting pin 37 are positioned between the first and second intake-side rocker arms 18 and 19, and the mutually abutting faces of the connecting pin 37 and the limiting member 38 are positioned between the second and third intake-side rocker arms 19 and 20, by the spring force of the return spring 39. Consequently, the rocker arms 18, 19 and 20 are angularly displaceable relative to one another, so that the rotation of the cam shaft 17 causes the first intake-side rocker arm 18 to be swung in response to the sliding contact with the first intake-side opening and closing cam 23, thereby opening and closing only one of the intake valves, namely valve $V_{I1}$ at a timing and in a lift amount according to the profile of the first intake-side opening and closing cam 23. In addition the third intake-side rocker arm 20 held in sliding contact with the slight-operating cam 25 is not subjected to any substantial swinging movement thereby substantially keeping the other intake valve $V_{I2}$ inoperative. Further, the second intake-side rocker arm 19 is swung by the second intake-side opening and closing cam 24, but its swinging movement exerts no influence on the first and third intake-side rocker arms 18 and 20. On the other hand, the exhaust valves $V_{E1}$ and $V_{E2}$ are opened and closed continuously at a timing and a lift amount according to the profiles of the exhaust-side opening and closing cams 26, 26.

Figure 4A:
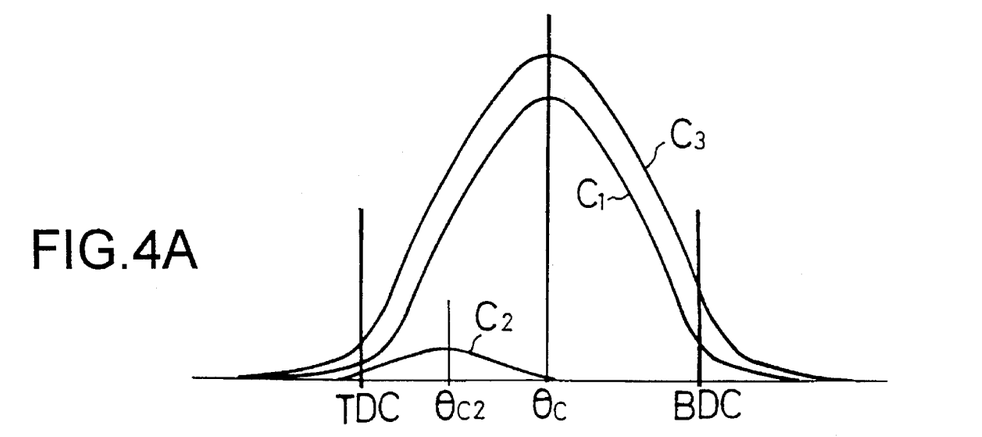
FIGS. 4A and 4B are diagrams illustrating the valve operating characteristics and the fuel injection time point of this invention.

Referring to FIG. 4A, a lift curve $C_1$ for opening the intake valve $V_{I1}$ by the first intake-side opening and closing cam 23 is shown and establishes that its opening angle center time $\theta_C$ of the maximum opening lift is a center time between the intake top dead center TDC and the intake bottom dead center BDC of the piston 4 and crankshaft. An opening and closing timing for the intake valve $V_{I2}$ that is only slightly opened by the slight-operating cam 25 is set such that an opening angle center time $\theta_{C2}$ in a slight lift curve $C_2$ provided by the slight-operating cam 25, i.e., the time at which the lift amount of the intake valve $V_{I2}$ is maximized, is provided in the first half of the intake stroke. The $C_2$ represents the lift caused by the shape of cam 25, which shape is not shown in the Figures because it would hardly be distinguishable from a perfect circle because of the small amount of lift over a substantial circumferential distance for the cam lobe.

If a high hydraulic pressure is applied to the hydraulic pressure chamber 40, such as in the high-speed rotational range of the engine, the connecting piston 36 is urged to move in a direction to increase the volume of the hydraulic pressure chamber 40 against a spring force of the return spring 39, while urging the connecting pin 37. When the axes of the connecting piston 36, the connecting pin 37 and the limiting member 38 have been aligned with one another, i.e., when each of the intake-side rocker arms 18, 19 and 20 has reached its stationary state because they engage base circle portions of their respective cams, the connecting piston 36 is fitted into the second intake-side rocker arm 19. In response to this, the connecting pin 37 is fitted into the third intake-side rocker arm 20, thereby achieving the connected states of the intake-side rocker arms 18, 19 and 20. Consequently, the first and third intake-side rocker arms 18 and 20 are swung along with the second intake-side rocker arm 19 that is swung by the second intake-side opening and closing cam 24, which has a larger lift than cams 23 and 25, thereby causing the intake valves $V_{I1}$ and $V_{I2}$ to be opened and closed as shown by an opening lift curve $C_3$ with a timing and a lift amount according to the profile of the second intake-side opening and closing cam 24. At all times, the exhaust-side rocker arms 21, 21 cause the exhaust $V_{E1}$ and $V_{E2}$ to be opened and closed with a timing and a lift amount according to the profiles of the exhaust-side opening and closing cam 26, 26.

A spark plug sleeve 44 is provided in the cylinder head 2 between the two exhaust-side rocker arms 21, 21, such that it is inclined toward the exhaust side of the engine. A spark plug 45 is inserted through the plug sleeve 44 and mounted to the cylinder head 2 substantially at a central portion of the ceiling surface of the combustion chamber 5.

Referring again to FIG. 1, an air cleaner 49 is connected to the intake port 8 in the cylinder head 2 through an intake manifold 46 and a throttle body 48 having a throttle valve 47. An intake passage 50 is defined in the throttle body 48 and the intake manifold 46 between the air cleaner 49 and the intake port 8. A bypass passage 51 and a first idle passage 52 are connected in parallel to the intake passage 50 to bypass the throttle valve 47. A bypass solenoid control valve 53 is provided in the bypass passage 51, and a wax-operated valve 54 is provided in the first idle passage 52 that is operated in accordance with the temperature of the cooling water in the engine body.

Figure 5:
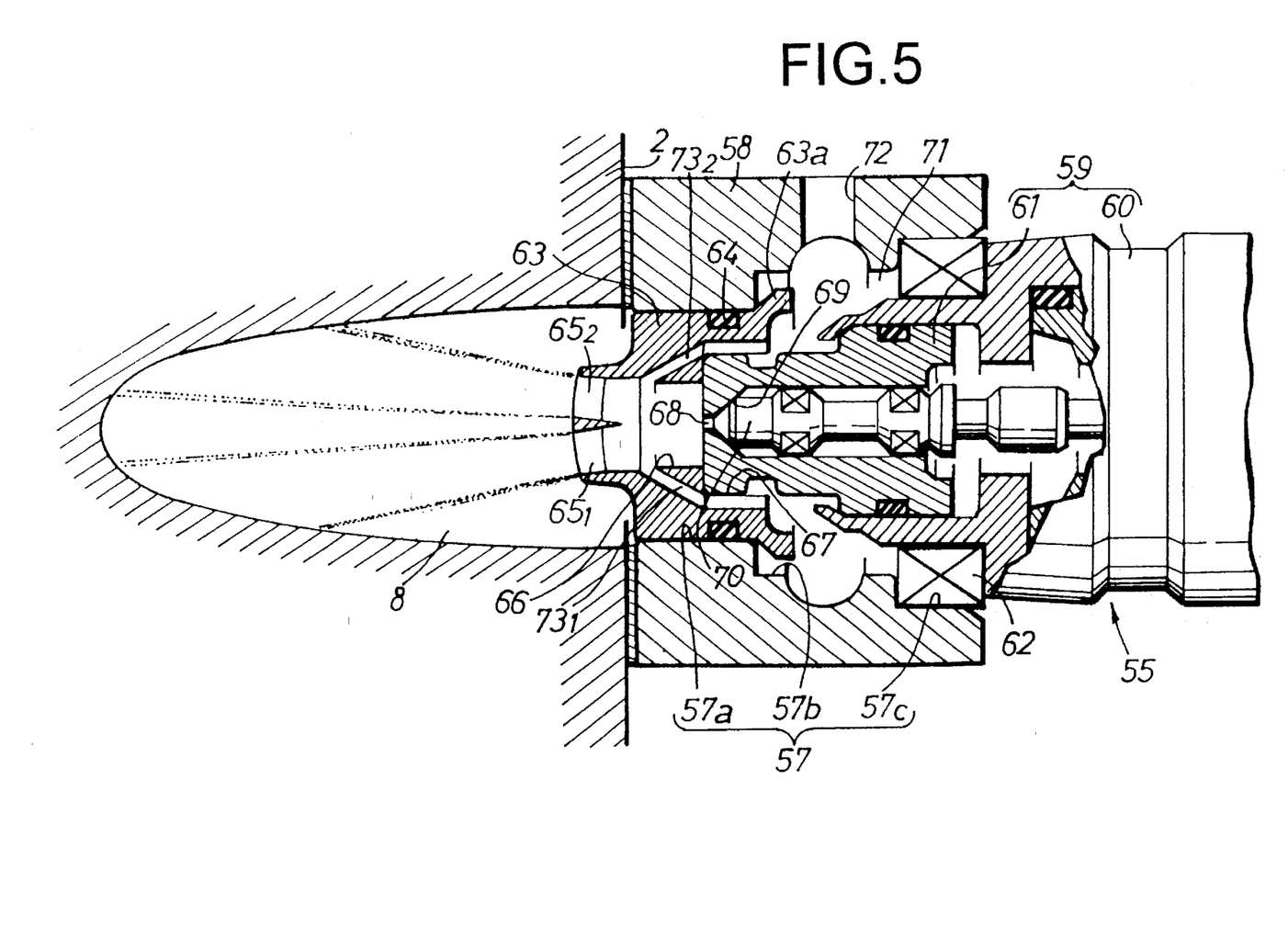
FIG. 5 is an enlarged cross-sectional plan view taken on the axis of the fuel injection valve.

Referring to FIG. 5, a fuel injection valve 55 is mounted at the end of the intake manifold 46 adjacent the cylinder head 2 for uniformly injecting a fuel through the intake port 8 toward the intake valve bores $6_1$ and $6_2$. A fuel supply source 56 (see FIG. 1) is connected to the fuel injection valve 55. A mounting member 58 is mounted at the end of the intake manifold 46 adjacent the cylinder head 2 and includes a mounting hole 57 having an axis extending obliquely from above toward the intake port 8. The fuel injection valve 55 is mounted to the mounting member 58 by pushing the tip end portion thereof into the mounting hole 57.

The mounting hole 57 includes a small-diameter hole portion 57a, a medium-diameter hole portion 57b and a large-diameter hole portion 57c which are coaxially connected in the order named from the inner side. The fuel injection valve 55 has a housing 59 which includes a basically cylindrical valve housing 61 secured at its rear end to a drive housing 60 containing a solenoid drive which is not shown. The housing 59 is mounted to the mounting member 58 by pushing the valve housing 60 into the mounting hole 57 with a seal member 62 interposed between the drive housing 60 and the mounting hole 57 at a step between the medium-diameter hole portion 57b and the large-diameter hole portion 57c of the mounting hole 57.

A cap 63 is fitted into the small-diameter hole portion 57a of the mounting hole 57 with a seal member 64 interposed therebetween, and has, at its rear end, an engage collar 63a engaging a step between the small-diameter hole portion 57a and the medium-diameter hole portion 57b of the mounting hole 57. The following holes are provided in a central portion of the cap 63 in the order named from the forward side (the left side in FIG. 5): a pair of fuel injection holes $65_1$ and $65_2$ inclined away from each other in a forward direction, a through-hole 66 commonly leading to rear ends of the fuel injection holes $65_1$ and $65_2$, and a fitting hole 67 having a diameter larger than that of the through-hole 66. The tip end of the valve housing 61 in the fuel injection valve 55 is fitted into the fitting hole 67 so that it is received in the step between the through-hole 66 and the fitting hole 67.

A valve bore 68 and a tapered valve seat 69 connected to the valve bore 68 are coaxially provided at a central portion of the tip end of the valve housing 61. A valve member 70 is axially movably accommodated in the valve housing 61 and is seatable on the valve seat 69. The valve member 70 is driven axially by the solenoid drive contained in the drive housing 60 between a position in which it is seated on the valve seat 69 to close the valve bore 68 and a position in which it is moved away from the valve seat 69 to open the valve bore 68. When the valve member 70 is moved away from the valve seat 69, the fuel from the fuel supply source 56 is injected through the pair of fuel injection holes $65_1$ and $65_2$ via the valve bore 68 and the through-hole 66.

Figure 6:
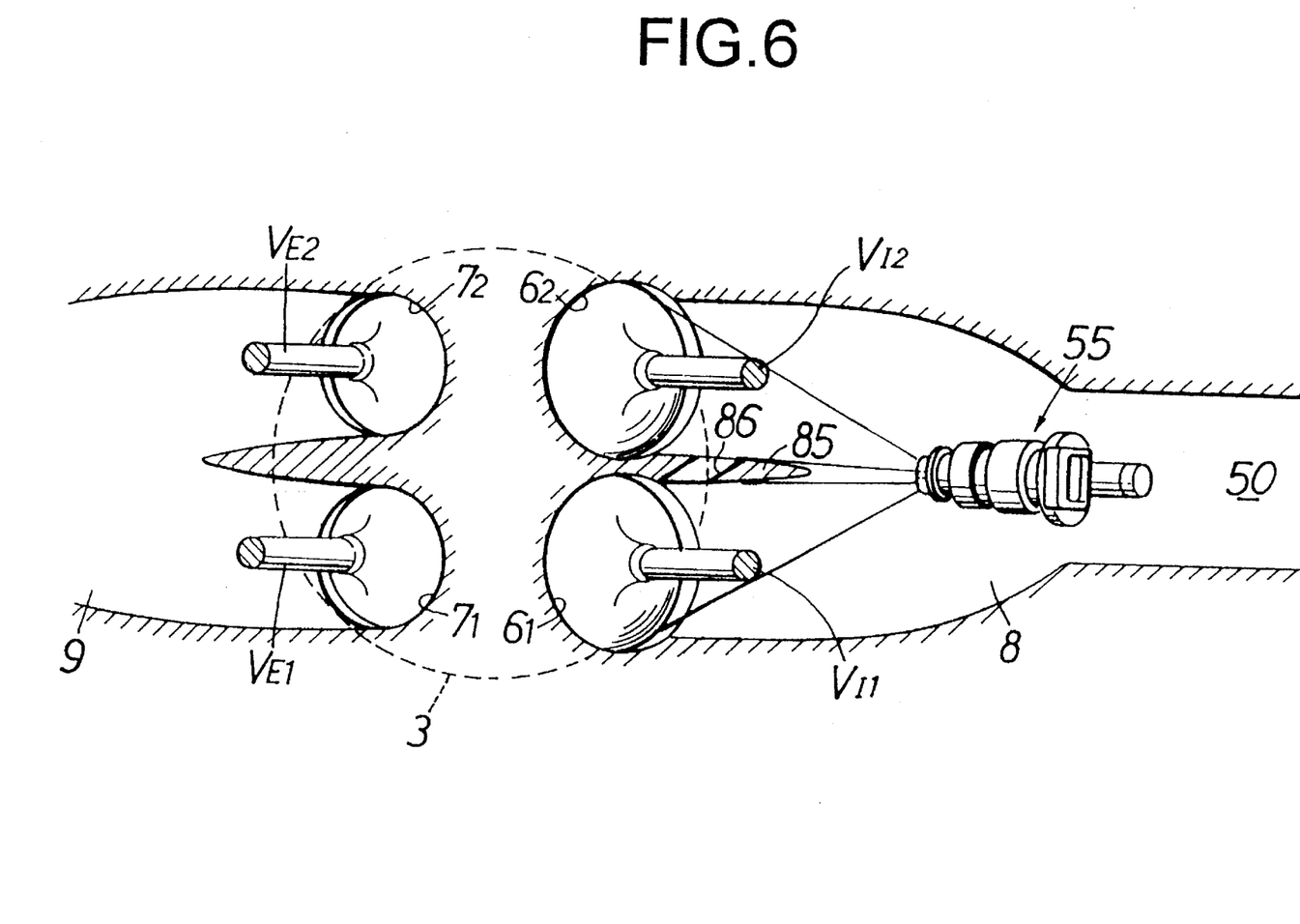
FIG. 6 is a diagrammatic cross-sectional plan view illustrating the direction of flow of fuel injected from the fuel injection valve.

Moreover, the fuel injection valve 55 is mounted to the mounting member 58, so that the fuel from the fuel injection holes $65_1$ and $65_2$ is injected equally into the intake valve bores $6_1$ and $6_2$ opened and closed by the intake valves $V_{I1}$ and $V_{I2}$, as shown in FIG. 6.

If necessary, a communication hole 86 may be provided in a diverging wall 85 for partitioning the intake valve bores $6_1$ and $6_2$, as shown in FIGS. 2 and 6. This communication hole 86 may be formed to smoothly guide the intake air flow from toward the intake valve bore $6_2$ opened by the intake valve $V_{I2}$ when operated in only a small lift amount toward the intake valve bore $6_1$. Thus, the fuel deposited on the side of the diverging wall 85 adjacent the intake valve bore $6_2$ can be guided along with a portion of the intake air flow toward the intake valve bore $6_1$, thereby enabling the formation of a homogenous air mixture and an providing an improvement in swirl characteristic to contribute to a reduction in the amount of harmful exhaust gas.

With the fuel injection valve 55 mounted to the mounting member 58, an annular air chamber 71 is defined between an inner surface of the mounting member 58 and the housing 59, and a passage 72 is provided in the mounting member 58 to lead to the air chamber 71. A pair of air assist holes $73_1$ and $73_2$ are provided in the cap 63 and have rear ends commonly communicating with the air chamber 71. The front ends of the air assist holes $73_1$ and $73_2$ are opened into rear ends of the fuel injection holes $65_1$ and $65_2$.

Referring also to FIG. 1, the passage 72 in mounting member 58 for each cylinder is connected to an air header 74. The air header 74 is connected to the intake passage 50 upstream of the throttle valve 47. The pair of air assist holes $73_1$ and $73_2$, the air chamber 71, the air header 74, a solenoid type air amount control valve 75 and an idle adjusting screw 76 constitute an assist air supply means 77.

An exhaust manifold 79 defining an exhaust passage 78 is connected to catalytic converter and a silencer, which are not shown, and is connected to the exhaust port 9 in the cylinder head 2. An exhaust gas return line 80 is provided to connect a portion of the exhaust passage 78 and a portion of the intake passage 50 downstream from the throttle valve 47. An exhaust gas control valve 81 is provided in the middle of the exhaust gas return line 80, and a solenoid type pilot valve 82 is provided between the exhaust gas control valve 81 and the portion of the intake passage 50 downstream from the throttle valve 47.

The operations of the connection switching solenoid control valve 42, the bypass solenoid control valve 53, the fuel injection valve 55, the solenoid type air amount control valve 75 in the assist air supply means and the solenoid type pilot valve 82 are controlled by a control means 84 including a computer. Supplied to the control means 84 are the intake pressure detected by an intake pressure sensor $S_p$, the temperature of the cooling water detected by an engine cooling water temperature sensor $S_T$, the number of revolutions of the engine detected by a revolution-number sensor $S_N$, the detection value detected by an air-fuel ratio sensor $S_A$ for detecting an air-fuel ratio from the exhaust gas composition in the exhaust passage 78, the opening degree of the throttle valve 57 detected by a throttle sensor $S_v$, the opening degree of the exhaust gas control valve 81 detected by a lift sensor $S_L$, i.e., an in indication of the amount of exhaust gas returned, and the like.

The control means 84 controls the operation of the valve characteristic varying means 35 in the valve operating device 16 in order to substantially stop the suction of air through the intake valve bore $6_2$ by substantially stopping the operation of intake valve $V_{I2}$ of the intake valves $V_{I1}$ and $V_{I2}$ to produce a swirl in the combustion chamber 5 during low loading of the engine, and controls the operation of the valve characteristic varying means 35 in the valve operating device 16 to operate both of the intake valves $V_{I1}$ and $V_{I2}$ during high loading of the engine, while at the same time, controlling the operations of the solenoid type air amount control valve 75 and the solenoid type pilot valve 82 in order to control the supply of the assist air from the assist air supply means 77 as well as the amount of exhaust gas returned in accordance with the operating condition of the engine.

Figure 4B:
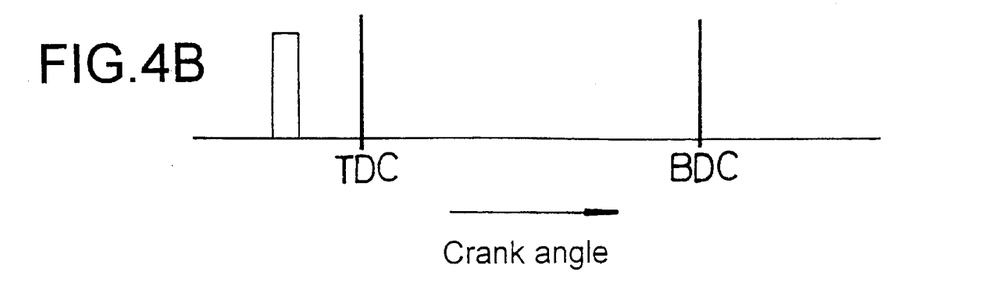

The control means 84 also controls the timing of the injection of the fuel from the fuel injection valve 55, so that the injection of the fuel is completed prior to the intake top dead center TDC, as shown in FIG. 4B when one $V_{I2}$ of the intake valves $V_{I1}$ and $V_{I2}$ is in its substantially stopped state.

The operation of this embodiment now will be described. When the engine is in a high-speed and high-load state, the control means 84 causes the intake-side rocker arms 18, 19 and 20 to be connected to one another by the valve operating-characteristic varying means 35, and the valve operating device 16 opens and closes the intake valves $V_{I1}$ and $V_{I2}$ with a timing and a lift amount which are determined by the second intake-side opening and closing cam 24.

When the engine is in a low-speed and low-load state, the valve operating-characteristic varying means 35 is switched to a state in which it disconnects the intake-side rocker arms 18, 19 and 20. This causes only one intake valve $V_{I1}$ of the intake valves $V_{I1}$ and $V_{I2}$ to be opened and closed with a timing and a lift amount which are determined by the first intake-side opening and closing cam 23, while allowing the other intake valve $V_{I2}$ to be substantially stopped. In this case, the other intake valve $V_{I2}$ is brought into a substantially stopped state in which it will be slightly opened, rather into a completely stopped or closed state. This makes it possible to prevent the fuel injected from the fuel injection valve 55 from accumulating between the intake valve bore $6_2$ and the intake port 8 to avoid a variation in the air-fuel ratio.

Figure 7:
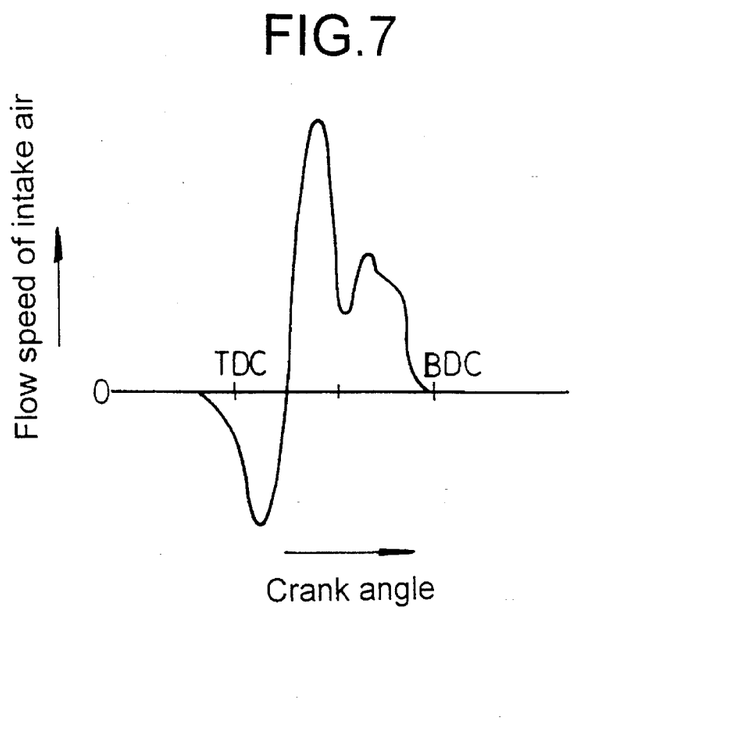
FIG. 7 is a graph illustrating results of an experiment for determining the flow speed of the intake air into a combustion chamber.

Because only one intake valve $V_{I1}$ of the intake valves $V_{I1}$ and $V_{I2}$ is opened and closed, and the other $V_{I2}$ is brought into the substantially stopped state, the air-fuel mixture is permitted to flow into the combustion chamber 5 substantially through only one intake valve bore $6_1$ of the intake valve bores $6_1$ and $6_2$ to produce a swirl in the combustion chamber 5. Moreover, the timing of opening and closing of the intake valve $V_{I2}$, that is opened and closed in a small lift amount, is set at a time point such that the lift amount is maximized in a first half of the intake stroke of the piston 4. An experiment was carried out by measuring the flow rate of the intake air drawn through the intake valve bore $6_1$ into the combustion chamber 5 in response to the opening of only the one intake valve $V_{I1}$ and provided the results shown in FIG. 7. As is apparent from FIG. 7, the flow speed of the intake air drawn into the combustion chamber 5 is higher in the first half of the intake stroke and lower in the second half of the intake stroke. Similar results have been provided even the intake valve $V_{I2}$ being opened and closed in a small amount. When the intake valve $V_{I2}$ is opened and closed in the small lift amount in the first half of the intake stroke, a larger flow speed of the intake air is provided, as compared with that when the intake valve $V_{I2}$ is opened and closed in the small lift amount in the second half of the intake stroke. Therefore, the atomization of the fuel supplied through the intake valve bore $6_1$ into the combustion chamber 5 can be promoted by a relatively high flow speed of the intake air with the opening and closing of the intake valve $V_{I2}$ in the small lift amount, thereby enhancing the combustibility of the fuel in the combustion chamber 5.

Figure 8:
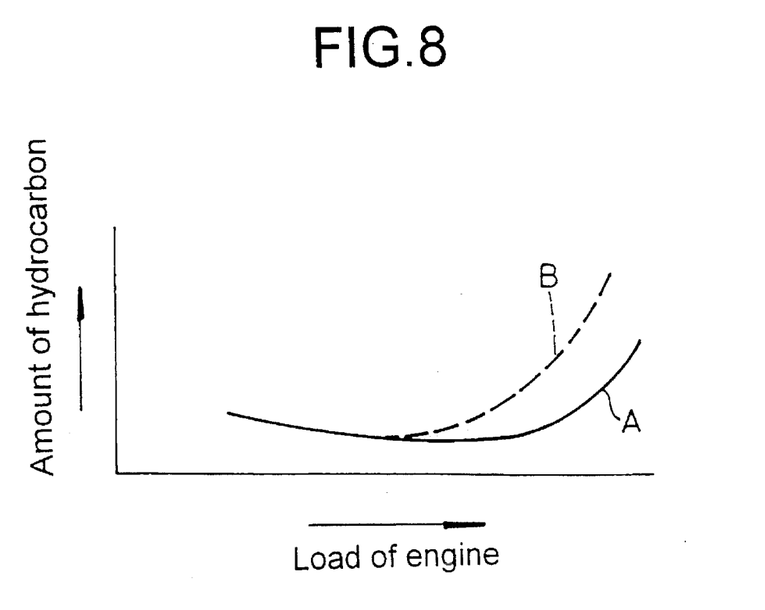
FIG. 8 is a graph illustrating the results of an experiment for determining the influences exerted on the nature of the exhaust gas by the timing of the opening and closing of an intake valve in a small lift amount.

An experiment was carried out for the purpose of comparing the influences exerted on the combustibility when the timing of opening and closing of the intake valve $V_{I2}$ in the small amount is in the first half of the intake stroke and when it is in the second half. The results of this experiment are as shown in FIG. 8. In FIG. 8, the axis of abscissas indicates the load on the engine, and the axis of ordinates indicates the amount of hydrocarbons in the exhaust gas. The curve A shown by a solid line indicates the results provided when the timing of the opening and closing of the intake valve $V_{I2}$ in the small amount is set in the first half of the intake stroke, and the curve B shown by a dashed line indicates the results provided when the timing of the opening and closing of the intake valve $V_{I2}$ is set in the second half. As is apparent from FIG. 8, it can be seen that when the timing of opening and closing of the intake valve $V_{I2}$ in the small amount is set in the first half of the intake stroke, the amount of hydrocarbons in the exhaust gas is smaller, which indicates an enhanced combustibility in the combustion chamber 5, as compared with that when it is set in the second half.

Figure 9:
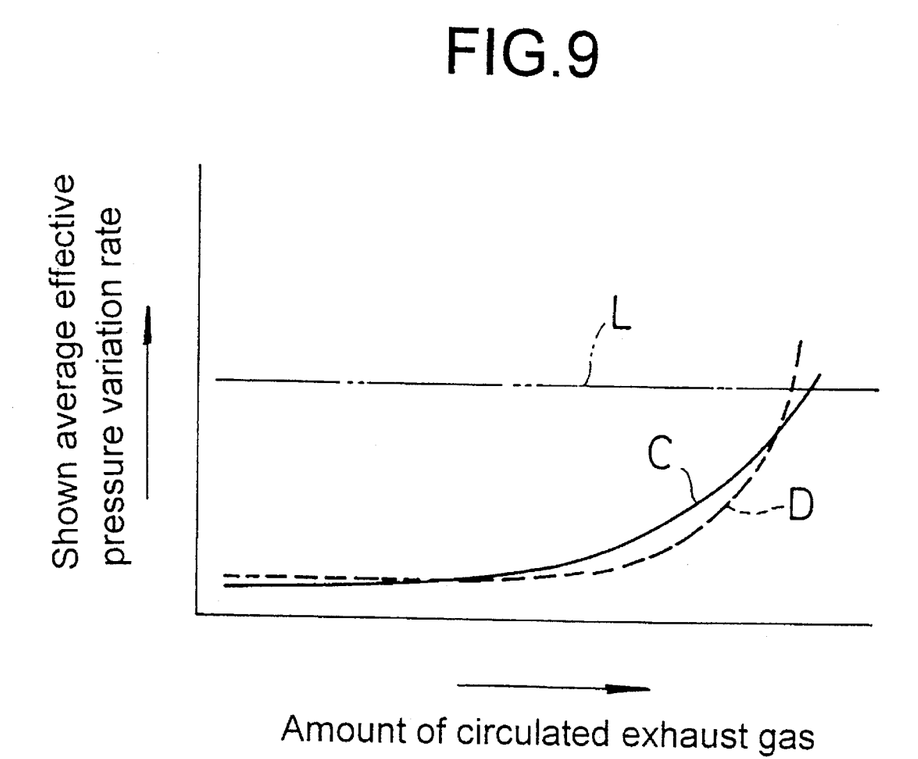
FIG. 9 is a graph illustrating the results of an experiment for determining the influences exerted on the combustion stability by the timing of the opening and closing of the intake valve in the small lift amount.

Impending the production of a swirl in the combustion chamber 5 must be avoided that would provide an unstable combustion due to the fact that the timing of opening and closing of the intake valve $V_{I2}$ in the small amount has been set in the first half of the intake stroke. Thus, an experiment was carried out for determining the influences exerted on the combustion stability at the different timings of opening and closing of the intake valve in the small lift amount. The results of this experiment are as shown in FIG. 9. This experiment was carried out by measuring the average effective pressure variation rates in accordance with a variation in the amount of exhaust gas recirculated. A curve C shown by a solid line in FIG. 9 indicates the average effective pressure variation rates provided when the timing of opening and closing of the intake valve $V_{I2}$ in the small amount has been set in the first half of the intake stroke, and a curve D shown by a dashed line indicates the average effective pressure variation rates provided when the timing is set in the second half. As apparent from FIG. 9, the variation in the opening and closing timing exerts only a small influence on the combustion stability in a range below a limit line L in FIG. 9, and hence, even if the timing of the opening and closing of the intake valve in the small lift amount is set in the first half of the intake stroke, the combustion is not degraded.

Further, the timing of the injection of the fuel from the fuel injection valve 55 is set at a time point such that the injection of the fuel is completed prior to the intake top dead center TDC. Therefore, at the time the intake valve $V_{I2}$ is opened in the first half of the intake stroke, the injection of the fuel from the fuel injection valve 55 has been completed, so that the fuel injected from the fuel injection valve 55 can be reliably introduced at a high intake air flow speed into the combustion chamber 5, which contributes to an improvement in responsiveness of the control of the air-fuel ratio.

Moreover, the fuel injection valve 55 includes the assist air supply means 77 and hence, in addition to the atomization of the fuel by the high air flow speed, the atomization of the fuel also can be provided by the air assist to further enhance the combustibility. In addition since the fuel injection valve 55 includes the pair of fuel injection holes $65_1$ and $65_2$, the amount of fuel injected toward the intake valve bores $6_1$ and $6_2$ by the fuel injection holes $65_1$ and $65_2$ can be equalized substantially reliably. Thus, in cooperation with the fact that the deposition of the fuel on the wall surface in the vicinity of the intake valve bore $6_2$ can be avoided by slightly opening the intake valve $V_{I2}$, as well as the fact that the timing of the injection of the fuel from the fuel injection valve 55 is set at the time point such that the injection of the fuel is completed prior to the intake top dead center TDC, the responsiveness of the control of the air-fuel ratio can be further improved, leading to an enhancement in the accuracy of the control of the air-fuel ratio to an optimal value for purification of the exhaust gas by a catalyst, and providing an enhancement in the nature of the exhaust gas and an increase in power output from the engine.

Further, by the fact that the fuel injection valve 55 includes the pair of fuel injection holes $65_1$ and $65_2$ for injecting the fuel equally toward the intake valve bores $6_1$ and $6_2$, it is possible to supply a required amount of the fuel through the intake valve bores $6_1$ and $6_2$ into the combustion chamber 5 to contribute to an increase in power output from the engine, when the intake valves $V_{I1}$ and $V_{I2}$ are opened and closed by the second intake-side opening and closing cam 24 during high loading of the engine.

Although the embodiment of the present invention has been described in detail, it will be understood that the present invention is not limited to the above-described embodiment and that various modifications in design can be made without departing from the spirit and scope of the invention defined in claims.

What is claimed is:

1. An internal combustion engine comprising: a valve operating device operatively connected to a pair of intake valves and capable of opening and closing one of said intake valves in accordance with an operating condition of the engine and capable of opening and closing the other said intake valve in a small lift amount, thereby producing a deflection of an intake air drawn into a combustion chamber; and a fuel injection valve for injecting a fuel toward a pair of intake valve bores independently opened and closed by said pair of intake valves, respectively; wherein the timing of opening and closing of said other intake valve which is opened and closed in the small lift amount is set at a time point when the lift amount is maximized in the first half of an intake stroke of a piston for said combustion chamber.

2. An internal combustion engine according to claim 1, wherein said fuel injection valve has a pair of fuel injection holes directed toward each said intake bore of said pair of intake valve bores.

3. An internal combustion engine according to claim 1 or 2, wherein said fuel injection valve includes an assist air supply means for atomizing the fuel.

4. An internal combustion engine according to claim 1 or 2, wherein a timing of injection of the fuel from said fuel injection valve is set at a time point such that the injection of the fuel is completed prior to an intake top dead center position of said piston.

5. An internal combustion engine according to claim 3, wherein a timing of injection of the fuel from said fuel injection valve is set at a time point such that the injection of the fuel is completed prior to an intake top dead center position of said piston.

6. An internal combustion engine according to claim 1 or 2, wherein said operating device causes both said intake valves to be opened a full amount in another operating condition of the engine.

7. An internal combustion engine having a piston in a cylinder comprising: a valve operating device for operating first and second intake valves in the cylinder to open and close said first intake valve a full lift amount and open and close said second intake valve for only a small lift amount, and means for opening and closing said second intake valve during substantially a first half of an intake stroke of the piston.

8. An internal combustion engine according to claim 7, wherein a fuel injection valve is provided and has a pair of fuel injection holes directed toward first and second intake valve bores opened and closed by said first and second intake valves, respectively.

9. An internal combustion engine according to claim 8, wherein said fuel injection valve includes an assist air supply means for atomizing the fuel.

10. An internal combustion engine according to claim 8 or 9, wherein a timing of injection of the fuel from said fuel injection valve is set at a time point such that the injection of the fuel is completed prior to an intake top dead center position of the piston.

11. An internal combustion engine according to claim 7, wherein a fuel injection valve is provided adjacent said first and second intake valves, and means are provided for causing injection of fuel from said fuel injection valve immediately prior to said opening of said second intake valve.

12. An internal combustion engine according to claim 11, wherein said fuel injection valve has a pair of fuel injection holes directed toward first and second intake valve bores opened and closed by said first and second intake valves, respectively.

13. An internal combustion engine according to claim 11 or 12, wherein said fuel injection valve includes an assist air supply means for atomizing the fuel.

* * * * *